UNITED STATES PATENT OFFICE.

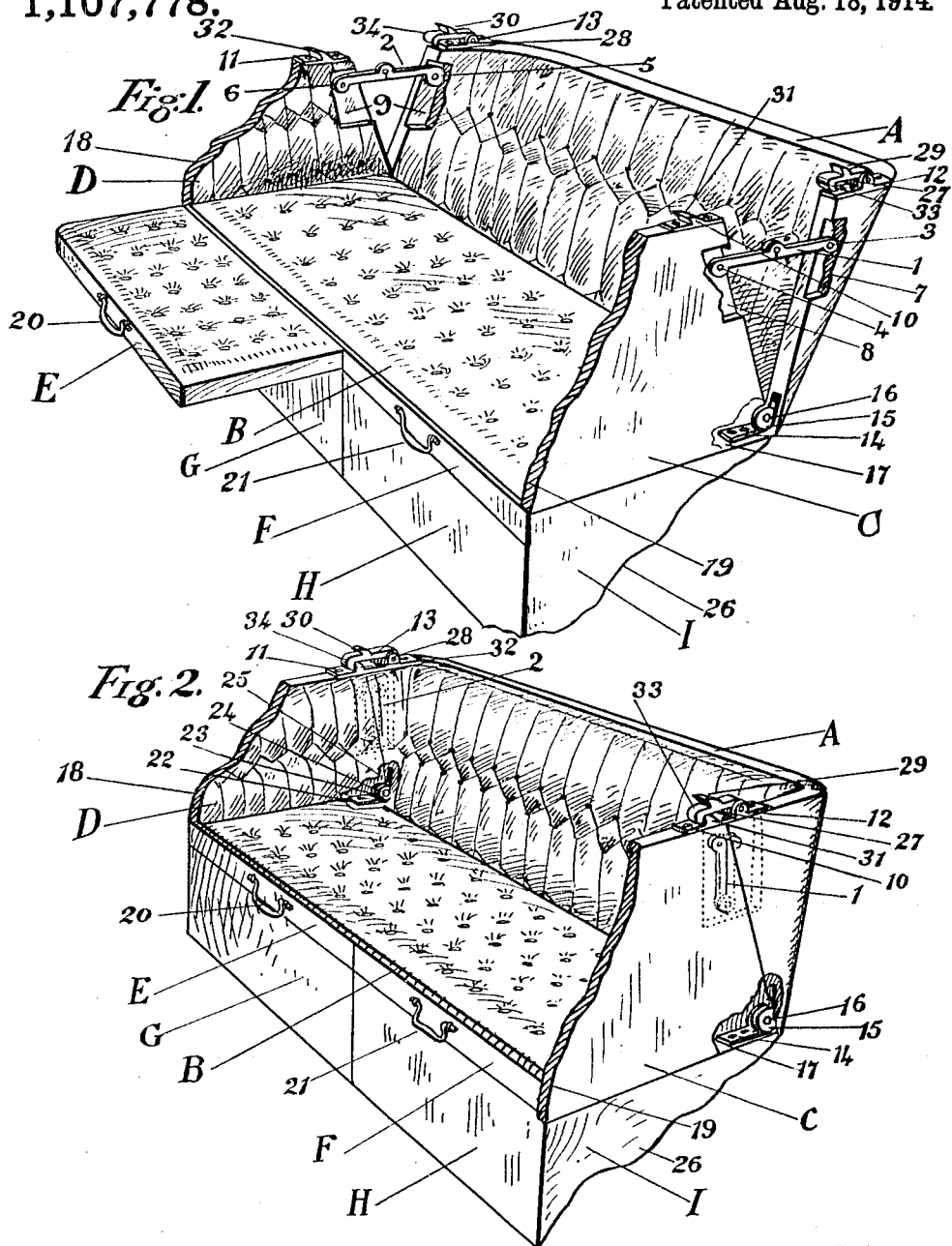

MARIA A. GAUGH, OF NEWPORT, KENTUCKY.

VEHICLE-SEAT.

1,107,778.  Specification of Letters Patent.  Patented Aug. 18, 1914.

Application filed March 22, 1913. Serial No. 756,089.

*To all whom it may concern:*

Be it known that I, MARIA A. GAUGH, a citizen of the United States, residing at Newport, in the county of Campbell and State of Kentucky, have invented new and useful Improvements in Vehicle-Seats, of which the following is a specification.

My invention relates, broadly speaking, to vehicle seats, and, more particularly, to that class of seats known as automobile seats.

The object of my invention is, to afford a vehicle seat having an adjustable back and foot-rest, so that an occupant can sit, while riding in the vehicle, in a rearwardly inclined position and have a suitable foot-rest for such a position. I accomplish this object by means of the mechanism set forth in the following illustrations and described in the following specification, like reference characters representing like parts in said illustrations.

Figure 1 is a perspective view of my invention, showing the seat adjusted so that an occupant may take therein a backwardly reclining position and have at the same time a suitable foot-rest for such a position. Fig. 2 is a perspective view of my invention, showing the seat adjusted to a normal position, suitable for an occupant while sitting in an erect position.

A is the adjustable back.

B is the bottom of the seat.

C and D are sides of the seat.

E and F are foot-rests. In Fig. 1, the foot-rest E is adjusted for use.

G and H are front inclosures for that portion of the seat underneath the cushion, which portion, however, may be left open in front, if desired.

I is a portion of the vehicle body, cut away at 26.

1 and 2 are elbow joints of the kind commonly used on buggy tops 3, 4, 5 and 6 are pins by means of which the free ends of said joints are secured to said seat and on which said free ends rotate. 7, 8 and 9 are portions of the seat, cut away in order to show more clearly the attachments of said joints to said seat.

10 and 11 are the front portions, and 12 and 13 are the rear portions, of catches adapted to bind the back A to the sides C and D. In the clamping operation, these catches are automatic. By means of the coiled springs 27 and 28, the rear portions of said catches are held down against the top of the seat. When the joints 1 and 2 are broken, and the back A brought forward against the sides of the seat C and D, the portions 12 and 13 abut the portions 10 and 11 and the hooked portions 31 and 32 engage the hooked portions 33 and 34. The portions 29 and 30 are adapted to be grasped by the fingers in unfastening these catches.

14 is a clip, terminating rearwardly in an eye and secured to the side C of the seat. 15 is a similar clip, reversed in position, and secured to the back A. These two eyes are brought together and secured one to the other by means of the pin 16, on which these clips rotate. 22, 23 and 24 are respectively similar clips and pins to those above described and employed on the opposite side of the seat.

17 and 25 are portions of the seat cut away in order to show to better advantage the parts above described.

18 and 19 are the lines on which the front portions of the sides of the seat are cut away.

20 and 21 are handles attached respectively to the foot-rests E and F.

It is to be noted that, by dividing the foot-rest of the seat into the two portions E and F, one of these portions, as E in Fig. 1, can be brought into use for the benefit of just one person, while the other portion, as F in Fig. 1, can remain inactive, if desired by the person occupying that side of the seat.

Having thus described my invention by illustrations in detail and as a working mechanism, what I claim is:—

In a vehicle seat, a rearwardly adjustable back, having its lower edge hingedly attached to the rear portion of the bottom of said seat, and having its upper portion secured to the upper portion of the sides of said seat by jointed rods of iron, adapted to fold the one portion thereof upon another portion thereof, in combination with a fastener one portion thereof being adapted to slidingly engage another portion thereof and secure the upper portion of said back to the upper portion of the sides of said seat whenever said back is brought into an upright position.

In testimony whereof I have hereunto set my hand in presence of two subscribing witnesses.

MARIA A. GAUGH.

Witnesses:
FRANCES G. HAZLEWOOD,
WILLIAM JOHN SCHULTZ.

Copies of this patent may be obtained for five cents each, by addressing the "Commissioner of Patents Washington, D. C."